United States Patent [19]
Greco

[11] 3,715,221
[45] Feb. 6, 1973

[54] OPTICAL GLASS
[75] Inventor: Edgar J. Greco, Rochester, N.Y.
[73] Assignee: Eastman Kodak Company, Rochester, N.Y.
[22] Filed: Jan. 29, 1971
[21] Appl. No.: 111,113

[52] U.S. Cl. .................................106/47 Q, 106/54
[51] Int. Cl. ..........C03c 3/12, C03c 3/30, C03c 3/00
[58] Field of Search ...............................106/47 Q, 54

[56] References Cited

UNITED STATES PATENTS

| | | | |
|---|---|---|---|
| 2,787,554 | 4/1957 | De Paolis | 106/47 Q |
| 3,150,990 | 9/1964 | Faulstich | 106/47 Q |
| 3,563,773 | 2/1971 | Bromer et al. | 106/54 |

FOREIGN PATENTS OR APPLICATIONS

| | | | |
|---|---|---|---|
| 1,109,698 | 4/1968 | Great Britain | 106/47 Q |

Primary Examiner—Winston A. Douglas
Assistant Examiner—M. Bell
Attorney—W. H. J. Kline and D. Peter Hochberg

[57] ABSTRACT

An optical glass having a high index of refraction, a low dispersion, and low color, consists essentially of lanthanum oxide ($La_2O_3$), thorium dioxide ($ThO_2$), tantalum pentoxide ($Ta_2O_5$), boric oxide ($B_2O_3$), silicon dioxide ($SiO_2$), and germanium dioxide ($GeO_2$).

10 Claims, No Drawings

OPTICAL GLASS

BACKGROUND OF THE INVENTION

1. Field of the Invention

This invention relates to optical glasses, and in particular to optical glasses having high refractive indices, low dispersions and low color.

2. Description of the Prior Art

It is well known in the glass and lens making arts that optical glasses having high indices of refraction and low dispersions (i.e. optical crown glasses) find great utility in lens systems. Glasses with high indices of refraction are desirable because they reduce the required curvature of the lens elements made from the glass, and thereby make possible the manufacture of many otherwise impractical lens systems. However, the development of optical glasses having very high refractive indices (i.e. where the index approaches and exceeds 1.90) has been severely impeded by the tendency of such glasses to exhibit a high color — i.e. these glasses exhibit undesirably high absorption in the visible region of the spectrum.

For example, U.S. Pat. No. 3,150,990 which issued on Sept. 29, 1964 teaches a "relatively" colorless high index glass having a high content of $La_2O_3$, $ThO_2$ and $Ta_2O_5$, and at least 2 percent by weight of niobium pentoxide ($Nb_2O_5$). The patent correctly points out that previous high index glasses were characterized by their high content of titanic oxide ($TiO_2$), which gave to the glass a yellow-brown color. However, it has been found that the very ingredient which the patentee of the cited patent finds essential to the achievement of the high index qualities attributed to his glass (as elaborated upon in a paper entitled "Mehrstoffsysteme zum Aufban optischer Glaser. Teil II: System $B_2O_3$ — $La_2O_3$ — $ThO_2$ — $Ta_2O_5$ — $Nb_2O_5$," which was published in Glatechnische Berichte 34 (No. 3): 102-107, in March 1961) is itself a source of objectionably high color. As is explained below, the present invention provides a high index crown glass having extremely low color, which is achieved at least in part by he absence of $Nb_2O_5$.

SUMMARY OF THE INVENTION

An object of the present invention is to provide an optical glass having a high index of refraction, a low dispersion, and low color.

Another object is to provide a glass having the aforementioned characteristics, which can be produced under practicable manufacturing conditions in an economical manner.

Other objects will be apparent to those skilled in the art, from the description to follow and from the appended claims.

These objects are achieved by the provision of the present invention of optical glasses consisting essentially of components in the following ranges of percentages by weight:

| Component | Weight Percent |
|---|---|
| lanthanum oxide ($La_2O_3$) | 15–30 |
| thorium dioxide ($ThO_2$) | 20–45 |
| tantalum pentoxide ($Ta_2O_5$) | 24–40 |
| boric oxide ($B_2O_3$) | 4–10 |
| silicon dioxide ($SiO_2$) | 1–9 |
| germanium dioxide ($GeO_2$) | 1–6 |

In addition to the foregoing components, the following components can be added within the specified ranges of weight percentages to achieve glasses exhibiting the desired characteristics:

| Component | Weight Percent |
|---|---|
| zirconium dioxide ($ZrO_2$) | 0–10 |
| titanium dioxide ($TiO_2$) | 0–5 |
| bismuth trioxide ($Bi_2O_3$) | 0–5 |
| lead monoxide (PbO) | 0–6 |
| potassium monoxide ($K_2O$) | 0–2 |
| barium oxide (BaO) | 0–5 |
| zinc oxide (ZnO) | 0–5 |
| arsenic trioxide ($As_2O_3$) | 0–2 |

DETAILED DESCRIPTION OF THE PREFERRED EMBODIMENTS

The present invention provides optical glasses having refractive indices ($n_D$) of 1.90 and above, low dispersions with Abbe numbers ($V_D$) within the range of 30–40, and extremely low color. These glasses belong to the system $B_2O_3$ — $La_2O_3$ — $ThO_2$ — $Ta_2O_5$, with a partial substitution of $SiO_2$ and $GeO_2$ for $B_2O_3$. Thus, a combination of glass formers ($B_2O_3$, $SiO_2$ and $GeO_2$) rather than the sole use of $B_2O_3$, enables the development of colorless, high index glasses. The low color of the present glasses has been attributed to the virtual absence of $Nb_2O_5$ and $TiO_2$. The excellent optical properties of these glasses appears to be due to the substantial exclusion of divalent metal ions, which are used in other glasses for the purpose of improving stability (at the expense of the optical properties of the glass). Slight amounts only of the following components having divalent metal ions are included in the glasses of the present invention:

barium oxide (BaO)
zinc oxide (ZnO)
cadmium oxide (CdO)

The foregoing components are not necessary for these glasses, but their addition has in some instances proven advantageous.

The following glasses, which were melted in platinum crucibles in a temperature range of 1340° to 1550°C, are characterized by especially high indices of refraction:

WEIGHT PERCENT OF EACH COMPONENT

| Example No. | $B_2O_3$ | $SiO_2$ | $GeO_2$ | $La_2O_3$ | $ThO_2$ | $Ta_2O_5$ | $TiO_2$ | $Bi_2O_3$ | BaO | $ZrO_2$ | PbO | $n_D$ | $v_D$ |
|---|---|---|---|---|---|---|---|---|---|---|---|---|---|
| 1 | 9.00 | 2.70 | 4.50 | 26.10 | 25.20 | 32.50 | | | | | | 1.94 | 36.7 |
| 2 | 9.00 | 2.55 | 4.25 | 24.66 | 23.81 | 30.71 | 5.00 | | | | | 1.97 | 31.9 |
| 3 | 9.00 | 2.55 | 4.25 | 24.66 | 23.81 | 30.71 | | 5.00 | | | | 1.94 | 35.1 |
| 4 | 9.00 | 2.41 | 4.00 | 23.21 | 32.43 | 28.92 | | | | | | 1.94 | 37.3 |
| 5 | 9.00 | 2.26 | 3.75 | 21.80 | 31.04 | 32.14 | | | | | | 1.95 | 36.2 |
| 6 | 9.00 | 1.81 | 3.01 | 20.49 | 25.89 | 39.78 | | | | | | 1.96 | 34.8 |
| 7 | 4.00 | 8.52 | 4.20 | 24.38 | 23.54 | 30.35 | | | | 5.00 | | 1.91 | 38.2 |
| 8 | 9.60 | 4.23 | 1.21 | 20.86 | 26.41 | 24.16 | 1.45 | | | 6.70 | 5.38 | 1.95 | 34.4 |

The components of these especially advantageous glasses fall within the following ranges of weight percentages:

| Component | Weight Percent |
|---|---|
| $B_2O_3$ | 4-10 |
| $GeO_2$ | 1-6 |
| $La_2O_3$ | 16-27 |
| $ThO_2$ | 23-41 |
| $Ta_2O_5$ | 24-40 |
| $TiO_2$ | 0-5 |
| $Bi_2O_3$ | 0-5 |
| $BaO$ | 0-5 |
| $ZrO_2$ | 0-7 |
| $PbO$ | 0-6 |

Up to two percent by weight of arsenic trioxide ($As_2O_3$) can be added to any of the above glass compositions as a clarifier.

The invention has been described in detail with particular reference to preferred embodiments thereof, but it will be understood that variations and modifications can be effected within the spirit and scope of the invention.

I claim:

1. Optical glasses having a refractive index in the range from 1.90 to 2.00 and an Abbe number in the range from 30.0 to 40.0, said glasses being free of $Nb_2O_5$ and consisting essentially of components in the following ranges of percentages by weight:

| Component | Percentage |
|---|---|
| lanthanum oxide ($La_2O_3$) | 15-30 |
| thorium dioxide ($ThO_2$) | 20-45 |
| tantalum pentoxide ($Ta_2O_5$) | 24-40 |
| boric oxide ($B_2O_3$) | 4-10 |
| silicon dioxide ($SiO_2$) | 1-9 |
| germanium dioxide ($GeO_2$) | 1-6 |

2. Optical glasses having a refractive index in the range from 1.90 to 2.00 and an Abbe number in the range from 30.0 to 40.0, said glasses being free of $Nb_2O_5$ and consisting essentially of components in the following ranges of percentages by weight:

| Component | Weight Percent |
|---|---|
| boric oxide ($B_2O_3$) | 4-10 |
| silicon dioxide ($SiO_2$) | 1-9 |
| germanium dioxide ($GeO_2$) | 1-6 |
| lanthanum oxide ($La_2O_3$) | 16-27 |
| thorium dioxide ($ThO_2$) | 23-41 |
| tantalum pentoxide ($Ta_2O_5$) | 24-40 |
| titanic oxide ($TiO_2$) | 0-5 |
| bismuth trioxide ($Bi_2O_3$) | 0-5 |
| barium oxide ($BaO$) | 0-5 |
| zirconium oxide ($ZrO_2$) | 0-7 |
| lead monoxide ($PbO$) | 0-6 |
| arsenic trioxide ($As_2O_3$) | 0-2 |

3. An optical glass according to claim 2 having the following composition by weight:

| Component | Weight Percent |
|---|---|
| $B_2O_3$ | 9.00 |
| $SiO_2$ | 2.70 |
| $GeO_2$ | 4.50 |
| $La_2O_3$ | 26.10 |
| $ThO_2$ | 25.20 |
| $Ta_2O_5$ | 32.50 |

4. An optical glass according to claim 2 having the following composition by weight:

| Component | Weight Percent |
|---|---|
| $B_2O_3$ | 9.00 |
| $SiO_2$ | 2.55 |
| $GeO_2$ | 4.25 |
| $La_2O_3$ | 24.66 |
| $ThO_2$ | 23.81 |
| $Ta_2O_5$ | 30.71 |
| $TiO_2$ | 5.00 |

5. An optical glass according to claim 2 having the following composition by weight:

| Component | Weight Percent |
|---|---|
| $B_2O_3$ | 9.00 |
| $SiO_2$ | 2.55 |
| $GeO_2$ | 4.25 |
| $La_2O_3$ | 24.66 |
| $ThO_2$ | 23.81 |
| $Ta_2O_5$ | 30.71 |
| $Bi_2O_3$ | 5.00 |

6. An optical glass according to claim 2 having the following composition by weight:

| Component | Weight Percent |
|---|---|
| $B_2O_3$ | 9.00 |
| $SiO_2$ | 2.41 |
| $GeO_2$ | 4.00 |
| $La_2O_3$ | 23.21 |
| $ThO_2$ | 32.43 |
| $Ta_2O_5$ | 28.92 |

7. An optical glass according to claim 2 having the following composition by weight:

| Composition | Weight Percent |
|---|---|
| $B_2O_3$ | 9.00 |
| $SiO_2$ | 2.26 |
| $GeO_2$ | 3.75 |
| $La_2O_3$ | 21.80 |
| $ThO_2$ | 31.04 |
| $Ta_2O_5$ | 32.14 |

8. An optical glass according to claim 2 having the following composition by weight:

| Composition | Weight Percent |
|---|---|
| $B_2O_3$ | 9.00 |
| $SiO_2$ | 1.81 |
| $GeO_2$ | 3.01 |
| $La_2O_3$ | 20.49 |
| $ThO_2$ | 25.89 |
| $Ta_2O_5$ | 39.78 |

9. An optical glass according to claim 2 having the following composition by weight:

| Composition | Weight Percent |
|---|---|
| $B_2O_3$ | 4.00 |
| $SiO_2$ | 8.52 |
| $GeO_2$ | 4.20 |
| $La_2O_3$ | 24.38 |
| $ThO_2$ | 23.54 |
| $Ta_2O_5$ | 30.35 |
| $BaO$ | 5.00 |

10. An optical glass according to claim 2 having the following composition by weight:

| Composition | Weight Percent |
|---|---|
| $B_2O_3$ | 9.60 |
| $SiO_2$ | 4.23 |
| $GeO_2$ | 1.21 |
| $La_2O_3$ | 20.86 |
| $ThO_2$ | 26.41 |
| $Ta_2O_5$ | 24.16 |
| $ZrO_2$ | 6.70 |
| $PbO$ | 5.38 |
| $TiO_2$ | 1.45 |

* * * * *